[19] United States Patent
Wnek

[11] 4,394,304
[45] Jul. 19, 1983

[54] ELECTRICALLY CONDUCTING POLYMER BLENDS

[75] Inventor: Gary E. Wnek, Natick, Mass.

[73] Assignee: Massachusetts Institute of Technology, Cambridge, Mass.

[21] Appl. No.: 344,143

[22] Filed: Jan. 29, 1982

[51] Int. Cl.³ .................. C08F 8/22; C08F 255/02; C08F 257/02; H01B 1/12

[52] U.S. Cl. .................. 252/520; 252/500; 252/512; 252/518; 524/80; 525/247; 525/275

[58] Field of Search ............. 252/500, 512, 518, 520; 525/247, 275; 524/80

[56] References Cited

U.S. PATENT DOCUMENTS

| | | | |
|---|---|---|---|
| 4,070,333 | 1/1978 | Jabloner | 525/275 |
| 4,222,903 | 9/1980 | Heegey et al. | 252/518 |
| 4,304,890 | 12/1981 | Suzuki et al. | 525/247 |
| 4,329,440 | 5/1982 | Kokubo et al. | 525/247 |

Primary Examiner—Stanford M. Levin
Attorney, Agent, or Firm—Arthur A. Smith, Jr.; Thomas J. Engellenner

[57] ABSTRACT

A method of forming a conductive polymer comprising a blend of at least one processable polymer, polyacetylene and a dopant by impregnating the processable polymer with a Ziegler-Natta catalyst; exposing the impregnated polymer to acetylene gas, whereby substantially linear molecules of polyacetylene are formed within a matrix of the processable polymer; and introducing a dopant into the polyacetylene, whereby a conductive blend is formed.

11 Claims, No Drawings

ELECTRICALLY CONDUCTING POLYMER BLENDS

TECHNICAL FIELD

This invention relates to conductive polymers and, in particular, to blends containing polyacetylene treated with electron donors or acceptors.

BACKGROUND OF THE INVENTION

Conductive polymers are highly sought after at the present time to serve as substitutes for metals in a variety of applications conducting electricity. For examples, conductive polymers hold promise in batteries, solar cells, semiconductors, electromagnetic shielding and even to replace traditional wiring.

Polyacetylene, or $(CH)_x$, is a material of considerable interest since it can be rendered highly conductive by treatment with a variety of electron donors or acceptors. The light weight and potential low cost of this polymeric material suggest that it may be used in a variety of technological applications. In fact, working p-n junctions and battery electrodes have been prepared by others. Unfortunately, $(CH)_x$ suffers three significant limitations with regard to practical applications. First, $(CH)_x$ is intractable (insoluble in all solvents and does not soften or melt) precluding fabrication of articles by conventional techniques. Second, it is oxidatively unstable, thereby severly restricting its use in ambient conditions. Finally, the thermodynamically stable trans isomeric form of $(CH)_x$ renders the material brittle.

There exists a need for conducting polymers utilizing the beneficial properties of polyacetylene but also having improved processability, stability and mechanical integrity.

SUMMARY OF THE INVENTION

I have discovered that blends of polyacetylene and various other matrix materials, such as polyethylene and polystyrene can be formed and rendered conductive by appropriate doing techniques. My technique involves impregnating various polymers which are more processable than polyacetylene with a Ziegler-Natta catalyst, for example, $Ti(n-OBu)_4/Et_3Al$, and exposing the impregnated polymer to acetylene gas which results in polyacetylene formation throughout the polymer matrix. By proper selection of the matrix, oxidation of the polyacetylene can be reduced and the ratio of the components can be varied to control processability. Conductivity may be achieved by immersing the blend in an appropriate dopant, such as iodine, or by diffusion or implantation techniques.

My invention will be described below in connection with various examples; however, it should be obvious to those skilled in the art that changes and modifications can be made without departing from the spirit or scope of my claims. For example, other matrix materials, such as polybutadiene or other polymers, or mixtures of more than two polymers may be employed. Other Ziegler-Natta catalysts or their equivalents may be used to convert acetylene to the $(CH)_x$ polymer. Moreover, additional treatment steps can be employed to further stabilize my conductive blends and dopants other than iodine can be used.

DESCRIPTION OF THE PREFERRED EMBODIMENT

The invention will be described in connection with the following non-limiting examples.

EXAMPLE I

A 0.3 mm thick, commercial low density polyethylene (LDPE) film was soaked in dry toluene for 24 hours to remove additives and immersed in a freshly-prepared solution containing dry toluene (60 ml), $Ti(OBu)_4$ (3.75 ml) and $Et_3Al$ (6 ml) in a Schlenk tube under argon. The tube was heated to ca. 70° C. under a slow stream of argon for ca. 1.5 hr. to impregnate the film with the catalyst. After cooling to room temperature, the catalyst solution was removed with a syringe and the orange-brown LDPE film was washed with fresh toluene to remove surface catalyst residues. The Schlenk tube was then connected to a high vacuum line and the toluene was removed by pumping. Next, the film was allowed to contact acetylene gas (initial pressure ca. 700 torr) for various periods of time. Polymerizations were carried out at temperatures between $-78°$ and 110° C. The high temperature polymerization was preferred since the polymerization rate is maximized without excessive melting of the matrix. During the high temperature polymerizations, the orange-brown catalyst impregnated LDPE film turned from blue to black as the acetylene diffuses into the film and polymerizes at the catalyst sites. Samples containing > ca. 5 wt.% $(CH)_x$ had a dull golden luster. The amount of $(CH)_x$ in the blends was determined by acetylene uptake during polymerization and elemental analysis of the resulting materials, which typically contain ca. 0.15 wt.% and 0.20 wt.% of Ti and Al, respectively. The results from both methods were generally in good agreement.

Visible absorption spectra of thin films prepared at 110° C. was consistent with the presence of the trans $(CH)_x$ isomer. The films remained flexible and tough indefinitely. Samples containing < ca. 5 wt.% $(CH)_x$ soften between 120°–150° C., although samples with ca. 6–10 wt.% $(CH)_x$ did not soften up to 210° C. This was apparently due to the presence of a lightly crosslinked, three-dimensional $(CH)_x$ network within the LDPE. Exposure of the films to a 2% solution of $I_2$ in pentane for 24–48 hours resulted in ultimate conductivities (four probe method) of ca. $5\Omega^{-1}$ cm$^{-1}$. A reasonably high conductivity was achieved at only 2 wt.% $(CH)_x$. That the conductivity is not due to solely surface-confined $(CH)_x$ was demonstrated by mounting the four platinum wires used for the conductivity measurements on the same side of the film and in another experiment mounting the pairs of wires on opposite sides. The results were essentially identical.

EXAMPLE II

A similar procedure was used, with some modification, to prepare polystyrene/$(CH)_x$ blends. Since polystyrene was soluble in the catalyst solution described above, impregnated films were prepared by evaporation of the solvent. After exposure to acetylene, black polystyrene/$(CH)_x$ blends were obtained. Exposure to iodine vapor rendered the blends conductive in the range from about $10^{-10}$ to about $10^1 \Omega^{-1}$ cm$^{-1}$. The blends soften above 100° C. depending on the blend composition.

In summary, a method for the preparation of novel conductive composites has been described. The resulting blends have reasonably high conductivities upon doping with iodine at a relatively low $(CH)_x$ concentration.

The method of blend preparation described above should be applicable to a wide variety of systems provided that the impregnated polymer does not react with the catalyst and that the monomer which is to form the second polymer is polymerizable by the catalyst. It should be pointed out that the invention is predominantly a novel means for preparing blends of two substantially linear polymers and should not be confused with well-known processes for preparing blends of crosslinked polymers (interpenetrating networks) by in-situ polymerization.

What I claim is:

1. A method of forming a conductive polymer comprising a blend of at least one processable polymer, polyacetylene and a dopant, the method comprising:
    (a) impregnating at least one processable polymer with a Ziegler-Natta catalyst;
    (b) exposing said impregnated polymer to acetylene gas, whereby substantially linear molecules of polyacetylene are formed within a matrix of the processable polymer; and
    (c) introducing a dopant into the polyacetylene, whereby a conductive blend is formed.

2. The process of claim 1 wherein the processable polymer is polyethylene.

3. The process of claim 1 wherein the processable polymer is polystyrene.

4. The process of claim 1 wherein the dopant is iodine.

5. The process of claim 1 wherein the catalyst is $Ti(n\text{-}OBu)_4/Et_3Al$.

6. The process of claim 1 wherein the step of impregnating the processable polymer with the catalyst further comprises impregnating said polymer with said catalyst at elevated temperatures.

7. The conductive polymer blend formed by the method of claim 1, 2 or 3.

8. A method of forming a conductive polymer blend comprising polyethylene and iodine-doped polyacetylene, the method comprising:
    (a) impregnating polyethylene with a Ziegler-Natta catalyst of the formula $Ti(n\text{-}OBu)_4/Et_3Al$;
    (b) exposing said impregnated polyethylene to acetylene gas, whereby polyacetylene is formed within a matrix of polyethylene; and
    (c) introducing iodine into the polyacetylene, whereby a conductive polymer is formed.

9. The polymer blend formed by the method of claim 8.

10. A method of forming a conductive polymer blend comprising polystyrene and iodine-doped polyacetylene, the method comprising:
    (a) impregnating polystyrene with a Ziegler-Natta catalyst of the formula $Ti(n\text{-}OBu)_4/Et_3Al$;
    (b) exposing said impregnated polystyrene to acetylene gas, whereby polyacetylene is formed within a matrix of polystyrene; and
    (c) introducing iodine into the polystyrene, whereby a conductive polymer is formed.

11. The polymer blend formed by the method of claim 10.

* * * * *